(12) United States Patent
Beavor

(10) Patent No.: US 11,174,068 B2
(45) Date of Patent: Nov. 16, 2021

(54) SHELF READY CONTAINERS WITH BIRD-FEEDER DISPENSOR

(71) Applicant: WestRock Shared Services, LLC, Atlanta, GA (US)

(72) Inventor: Ryan T. Beavor, Peachtree Corners, GA (US)

(73) Assignee: WESTROCK SHARED SERVICES, LLC, Atlanta, GA (US)

( * ) Notice: Subject to any disclaimer, the term of this patent is extended or adjusted under 35 U.S.C. 154(b) by 79 days.

(21) Appl. No.: 16/560,466

(22) Filed: Sep. 4, 2019

(65) Prior Publication Data

US 2020/0087025 A1 Mar. 19, 2020

Related U.S. Application Data

(60) Provisional application No. 62/730,806, filed on Sep. 13, 2018.

(51) Int. Cl.
| | |
|---|---|
| *B65D 5/72* | (2006.01) |
| *B65D 5/02* | (2006.01) |
| *A01K 39/012* | (2006.01) |
| *B65D 5/54* | (2006.01) |

(52) U.S. Cl.
CPC .......... *B65D 5/722* (2013.01); *A01K 39/0125* (2013.01); *B65D 5/0227* (2013.01); *B65D 5/541* (2013.01); *A01K 2227/30* (2013.01)

(58) Field of Classification Search
CPC ...... B65D 5/722; B65D 5/0227; B65D 5/541; B65D 5/5213; A01K 39/0125; A01K 39/012

USPC ....... 229/122.1, 221, 122, 103, 125.15, 913; 221/305, 302, 280; 119/52.2; 222/564; 206/759, 216, 738

See application file for complete search history.

(56) References Cited

U.S. PATENT DOCUMENTS

| | | | | |
|---|---|---|---|---|
| 2,556,661 | A | * 6/1951 | Rendall | B65D 5/722 229/121 |
| 2,891,711 | A | * 6/1959 | Early | B65D 5/722 229/221 |
| 3,441,002 | A | * 4/1969 | Skirvin | A01K 39/012 119/52.2 |
| 5,372,094 | A | * 12/1994 | Zens | A01K 39/012 119/430 |
| 5,458,272 | A | 10/1995 | Ward-Weber | |
| 6,189,778 | B1 | 2/2001 | Kanter | |
| 6,923,365 | B2 | 8/2005 | Auclair et al. | |
| 8,789,704 | B2 | 7/2014 | Nowak | |

(Continued)

*Primary Examiner* — Christopher R Demeree
(74) *Attorney, Agent, or Firm* — Neil G. Cohen

(57) ABSTRACT

A container includes a plurality of panels connected together at fold lines to extend at least partially around an interior space. A plurality of end flaps are each foldably connected to a respective one of the panels. The end flaps are overlapped with one another to enclose an end of the interior space. One of the end flaps is a main bird-feeder flap. A side bird-feeder flap foldably connected to the main bird-feeder flap. The main bird-feeder flap and the side bird-feeder flap are configured to deploy from a closed position cooperating with the plurality of end flaps to enclose the end of the interior space, to an open position with the main bird-feeder flap hinged outward from the interior space to form an opening in the end of the interior space, and with the side bird-feeder flap forming a side of the opening.

16 Claims, 4 Drawing Sheets

(56) References Cited

U.S. PATENT DOCUMENTS

| | | | |
|---|---|---|---|
| 9,415,893 B2 * | 8/2016 | Wintermute | B65D 5/16 |
| 2006/0289616 A1 * | 12/2006 | McGowan | B65D 5/722 |
| | | | 229/122.1 |
| 2012/0018503 A1 * | 1/2012 | Walling | B65D 5/725 |
| | | | 229/122.1 |

* cited by examiner

SHELF READY CONTAINERS WITH BIRD-FEEDER DISPENSOR

REFERENCE TO RELATED APPLICATION

This application claims the benefit of priority under 35 U.S.C. § 119(e) of U.S. provisional application Ser. No. 62/730,806 filed on Sep. 13, 2018, which is hereby incorporated by reference in its entirety.

BACKGROUND OF THE INVENTION

Field of the Invention

The present disclosure relates to shelf-ready containers, and more particularly to containers with gravity fed bird-feeder dispensers.

Description of Related Art

Retail ready or shelf ready containers can be used both for storing product during shipping and for dispensing product in the retail setting. Gravity fed dispensing configurations provide an opening at or near the bottom of a container so that consumers can obtain the product directly from the container. As more and more product is removed from the container by consumers, gravity continues to move the remaining product in the container down toward the opening.

The conventional techniques have been considered satisfactory for their intended purpose. However, there is an ever present need for improved shelf ready containers. This disclosure provides a solution for this need.

SUMMARY OF THE INVENTION

A container includes a plurality of panels connected together at fold lines to extend at least partially around an interior space, including a top panel, a first side panel, a bottom panel and a second side panel. A plurality of end flaps are each foldably connected to a respective one of the panels. The end flaps are overlapped with one another to enclose an end of the interior space. One of the end flaps is a main bird-feeder flap. A side bird-feeder flap foldably connected to the main bird-feeder flap. The main bird-feeder flap and the side bird-feeder flap are configured to deploy from a closed position cooperating with the plurality of end flaps to enclose the end of the interior space, to an open position with the main bird-feeder flap hinged outward from the interior space to form an opening in the end of the interior space, and with the side bird-feeder flap forming a side of the opening.

The side bird-feeder flap can include a rounded edge extending from the main bird-feeder flap to a catch edge. The rounded edge can be radiused to clear an edge of the opening for hinging the main bird-feeder flap to the open position. The catch edge can be configured to catch on the edge of the opening to prevent over opening the main bird-feeder flap. The side bird-feeder flap can be a first side bird-feeder flap and a second side bird-feeder flap is foldably connected to the main bird-feeder flap opposite the first side bird-feeder flap. The top panel, bottom panel, first side panel, and second side panel can be devoid of bird-feeder flaps.

The plurality of end flaps can include the main bird-feeder flap foldably connected to the bottom panel, a first side end flap foldably connected to the first side panel, a second side end flap foldably connected to the second side panel, and an outer end flap foldably connected to the top panel. The outer end flap can include an upper section and a lower section separated from one another by a line of weakness. The upper section of the outer end flap can be adhered to an outer surface of the first and second side end flaps. The lower section of the outer end flap can be adhered to an outer surface of the main bird-feeder flap so that the line of weakness can be broken to deploy the main bird-feeder flap to the open position. An upper edge of the main bird-feeder flap can define a lunate cut out configured to facilitate manual deployment of the main bird-feeder flap. The outer end flap can include a lunate nick overlapping with lunate cut out. The lunate nick can be configured to be broken to allow access to the lunate cut out for manual deployment of the main bird-feeder flap.

The plurality of end flaps can be a first plurality of end flaps and a second plurality of end flaps can be included at an opposite end of the panels from the first plurality of end flaps. Each end flap of the second plurality of end flaps can be foldably connected to a respective one of the panels. The end flaps of the second plurality of end flaps can be overlapped with one another to enclose an end of the interior space opposite the first plurality of end flaps. An adhesive flap can be foldably connected to the second side panel and adhered to the top panel.

A blank for a container as described above includes a plurality of panels connected together at fold lines configured for extending at least partially around an interior space, including a top panel, a first side panel, a bottom panel and a second side panel. A plurality of end flaps are each foldably connected to a respective one of the panels. The end flaps are configured to be overlapped with one another to enclose an end of the interior space. One of the end flaps is a main bird-feeder flap. A side bird-feeder flap is foldably connected to the main bird-feeder flap. The main bird-feeder flap and the side bird-feeder flap are configured to deploy as described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
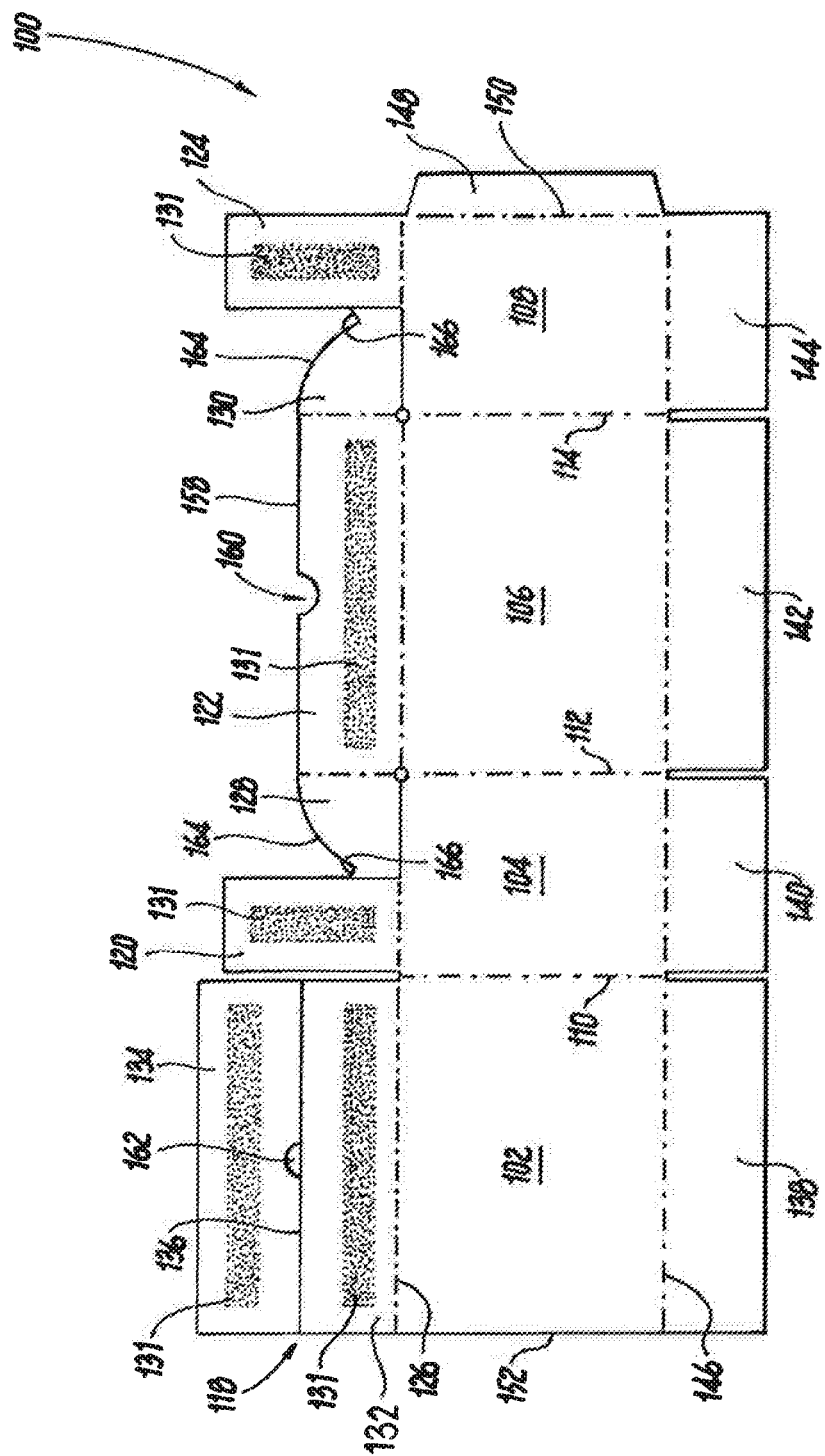
FIG. 1 is a plan view of an exemplary embodiment of a blank constructed in accordance with the present disclosure, showing the panels, end flaps, and fold lines.

Reference will now be made to the drawings wherein like reference numerals identify similar structural features or aspects of the subject disclosure. For purposes of explanation and illustration, and not limitation, a partial view of an exemplary embodiment of a blank for a container in accordance with the disclosure is shown in FIG. 1 and is designated generally by reference character 100. Other embodiments of containers in accordance with the disclosure, or aspects thereof, are provided in FIGS. 2-10, as will be described. The systems and methods described herein can be used for shipping product and for gravity fed dispensing of product in a retail setting. The blank 100 of FIGS. 1-2 can be formed into the container 101 shown in FIGS. 2-10.

Figure 3:
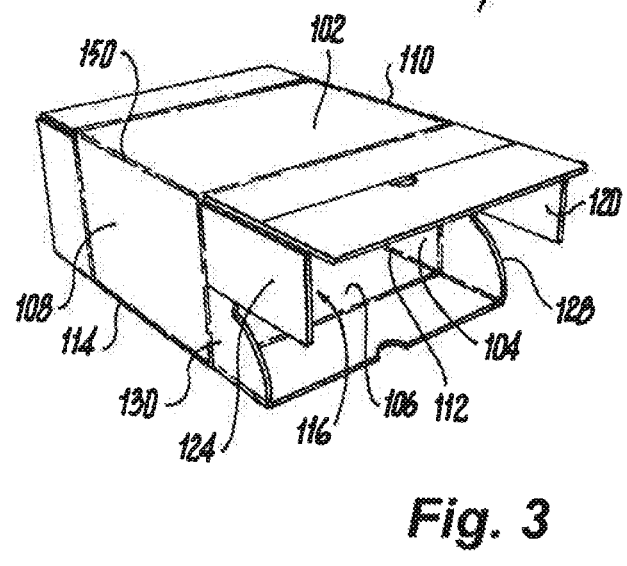
FIG. 3 is a perspective view of the blank of FIG. 1, showing the blank being erected into a container.

Referring now to FIG. 1, the blank 100 includes a plurality of panels 102, 104, 106, 108 connected together at fold lines 110, 112, 114 to extend at least partially around an interior space 116 (identified in FIG. 3). The top panel 102 connects to the first side panel 104 along fold line 110. The first side panel 104 connects to the bottom panel 106 along fold line 112. The bottom panel 106 connects to the second side panel 108 along fold line 114.

Figure 4:
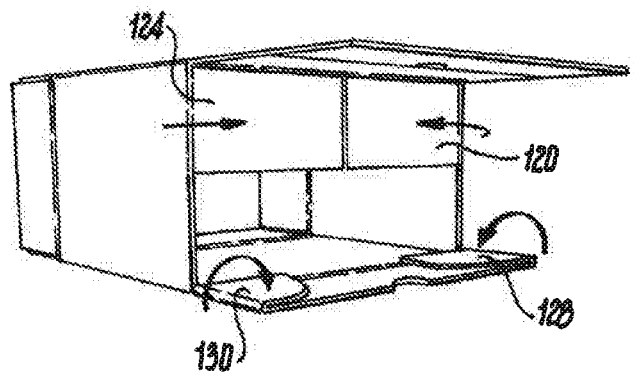
FIG. 4 is a perspective view of the container of FIG. 3, showing the end flaps being folded to enclose the first end of the container.
Figure 5:
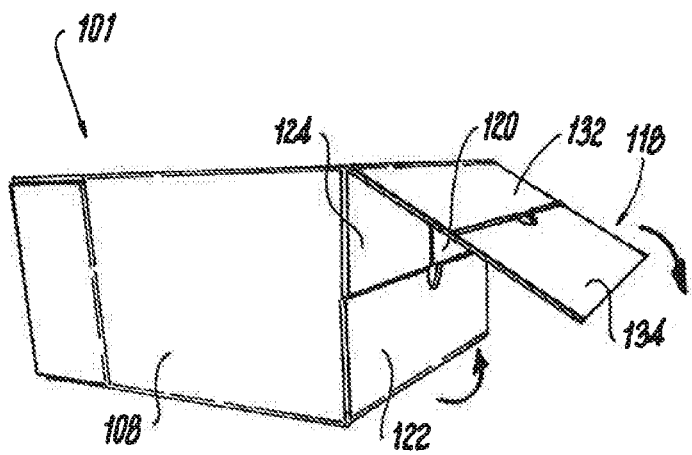
FIG. 5 is a perspective view of the container of FIG. 3, showing the outer flap being folded and adhered to the other end flaps at the first end of the container.

Four end flaps 118, 120, 122, 124 are each foldably connected to a respective one of the panels 102, 104, 106, 108 along fold line 126. The main bird-feeder flap 122 is foldably connected to the bottom panel 106. A first side end flap 120 is foldably connected to the first side panel 104, A second side end flap 124 is foldably connected to the second side panel 108. An outer end flap 118 is foldably connected to the top panel 102. The end flaps 120, 122, and 124 are overlapped by end flap 118 to enclose an end of the interior space 116 as shown in FIGS. 3-5.

Figure 2:
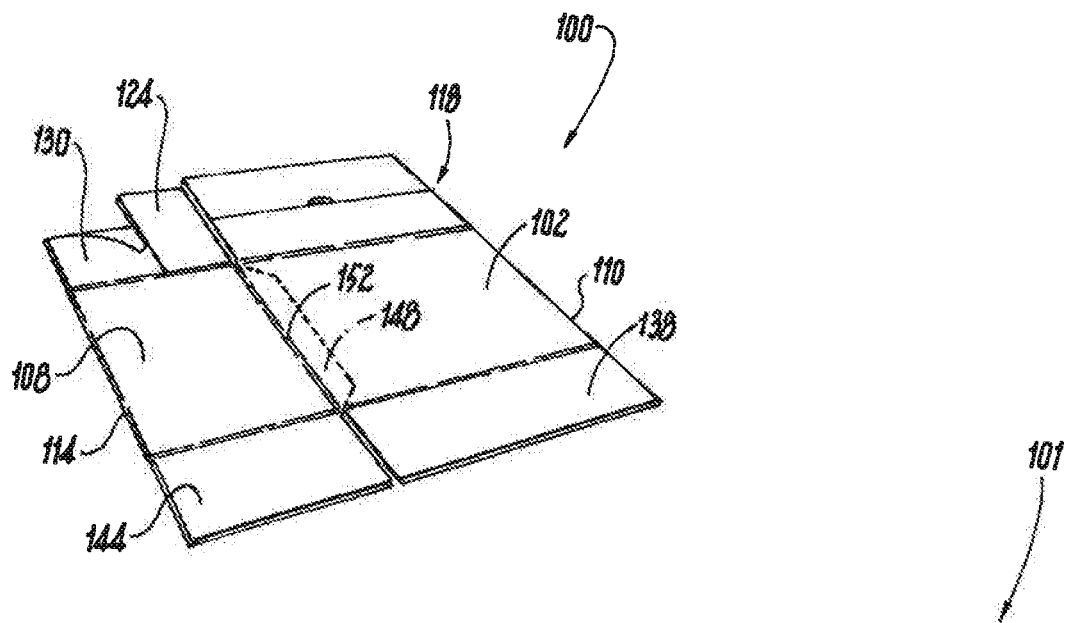
FIG. 2 is a perspective view of the blank of FIG. 1, showing the adhesive flap adhered to the top panel, e.g., for palletization of multiple blanks.

One of the end flaps 118, 120, 122, 124 is a main bird-feeder flap 122. A respective side bird-feeder flap 128, 130 is foldably connected along a respective fold line 112, 114 to the main bird-feeder flap 122 at each of the two opposed ends of the main bird-feeder flap 122. The side bird-feeder flaps 128, 130 are nicked to flaps 120, 124, respectively, keeping them attached so that the container 101 can be erected normally as shown in FIGS. 2-3. If these were not nicked, the flaps 128, 130 could remain flat and possibly tear off in a case erector. The outer end flap 118 includes an upper section 132 and a lower section 134 separated from one another by a line of weakness 136, which can be a perforation, score line, or the like.

A second plurality of end flaps 138, 140, 142, 144 is included at an opposite end of the panels 102, 104, 106, 108 from the first plurality of end flaps 118, 120, 122, 124. Each end flap 138, 140, 142, 144 is foldably connected to a respective one of the panels 102, 104, 106, 108 along fold line 146. The end flaps 138, 140, 142, 144 are configured to be overlapped with one another to enclose an end of the interior space 116 (identified in FIG. 3) opposite the first plurality of end flaps 118, 120, 122, 124. An adhesive flap 148 is foldably connected to the second side panel 108 along fold line 150.

With reference now to FIG. 2, the blank 100 can be folded along fold lines 114 and 110. The adhesive flap 148 can be adhered to the top panel 102 along the edge 152 of the top panel opposite the fold line 110. In this form shown in FIG. 2, multiple blanks 100 can be palletized and shipped in bulk, e.g. from a first plant where the blanks 100 are made to a second plant where the blanks are erected and filled with product.

With reference now to FIG. 3, the blank in the form shown in FIG. 2 can be erected into a container 100 using parallelogram motion hinging along fold lines 110, 112, 114, 150 to form the panels 102, 104, 106, 108 around the rectangular cuboid interior space 116. Next, as shown in FIG. 4, the end flaps 120, 124 can be folded inward and the side bird-feeder flaps 128, 130 can be folded in against the main bird-feeder flap 122 as indicated by the curved arrows in FIG. 4.

Figure 6:
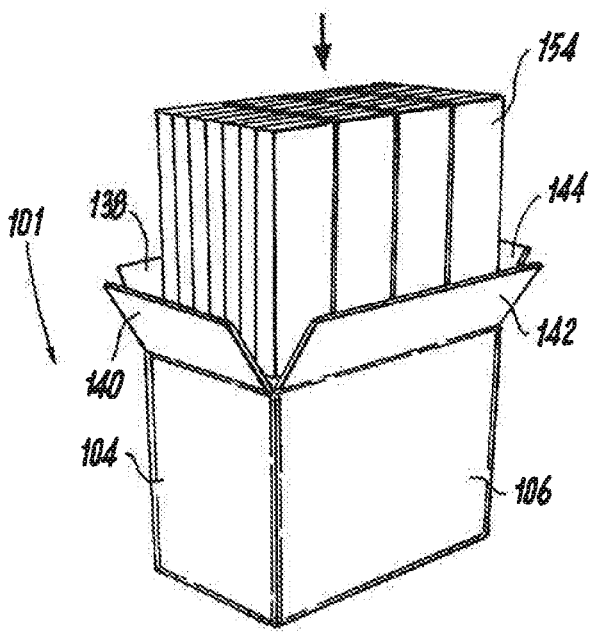
FIG. 6 is a perspective view of the container of FIG. 3, showing product being loaded into the second end of the container.
Figure 7:
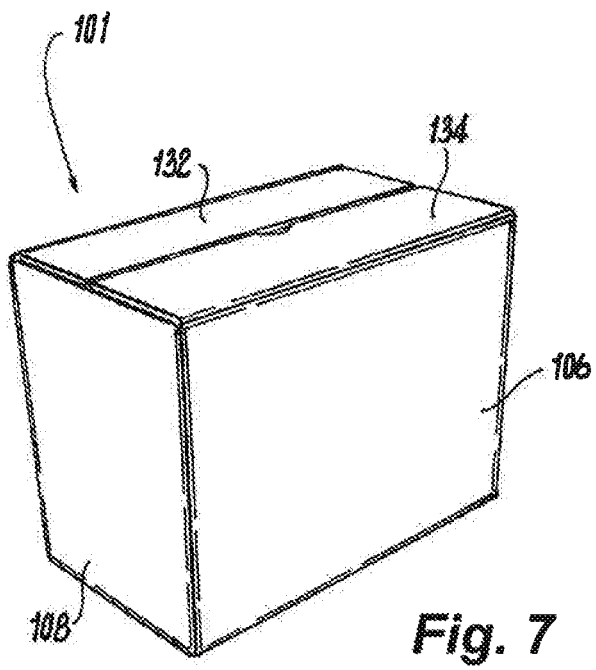
FIG. 7 is a perspective view of the container of FIG. 3, showing the end flaps of the second end of the container overlapped and adhered to close the second end of the container.

With reference now to FIG. 5, the main bird-feeder flap 122 can next be folded upward (as oriented in FIG. 5) and the end flap 118 can be folded downward (as oriented in FIG. 5) as indicated by the curved arrows in FIG. 5. The upper section 132 of the outer end flap 118 is adhered to the outer surface of the first and second side end flaps 120, 124. The lower section 134 of the outer end flap 118 is adhered to the outer surface of the main bird-feeder flap 122. The end flap 118, in particular upper and lower sections 132, 134 should be glued or otherwise adhered to flaps 120, 124, 122 for the bird feeder to deploy and stay together properly, as opposed to simply taping the first end of the container 101 closed. This encloses the first end of the interior space (which is identified in FIG. 3). As shown in FIG. 6, product 154 can be loaded into the interior space 116 through the still open end of the container 101 and then the end flaps 138, 140, 142, 144 can be folded and adhered together as shown in FIG. 7 to fully enclose the product 154 within the container 101. A case erector can be used to erect the blank 100 of FIG. 2 into the container 101. The areas 131 of the end flaps 118, 120, 122, 124 where adhesive adheres the end flaps 118, 120, 122, 124 together are indicated in FIG. 1.

In this configuration, multiple containers 101 can be stacked on top of one another because the panels 102, 104, 106, 108 can support the weight of the containers 101 and product 154 stacked on top of them due to there being no lines of weakness such as line of weakness 136 in any of the panels 102, 104, 106, and 108. These panels can bear greater loads due to the fact that the bird-feeder flaps 122, 128, 130 and line of weakness 136 are defined in the end flaps 118, 120, 122, 124 and the fact that the panels 102, 104, 106, 108 are devoid of bird-feeder flaps and associated lines of weakness. The container 101 can be shipped like a regular slotted container (RSC), e.g., with the end flaps 118, 120, 122, 124, 138, 140, 142, 144 on the bottom and top of the product 154. Before the bird feeder flap 122 is deployed as described below the container is rotated an upright position as shown in FIG. 7 to a side position resting on panel 106 as shown in in FIG. 8.

Figure 8:
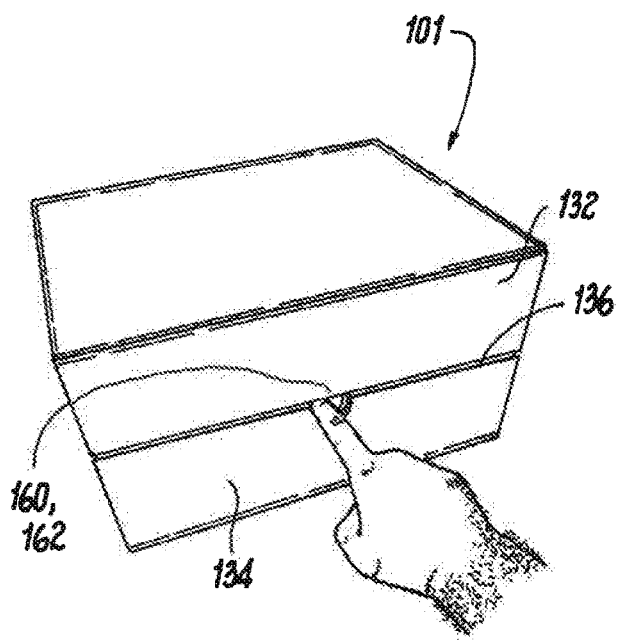
FIG. 8 is a perspective view of the container of FIG. 3, showing manual breaking of the lunate nick in the outer flap.
Figure 9:
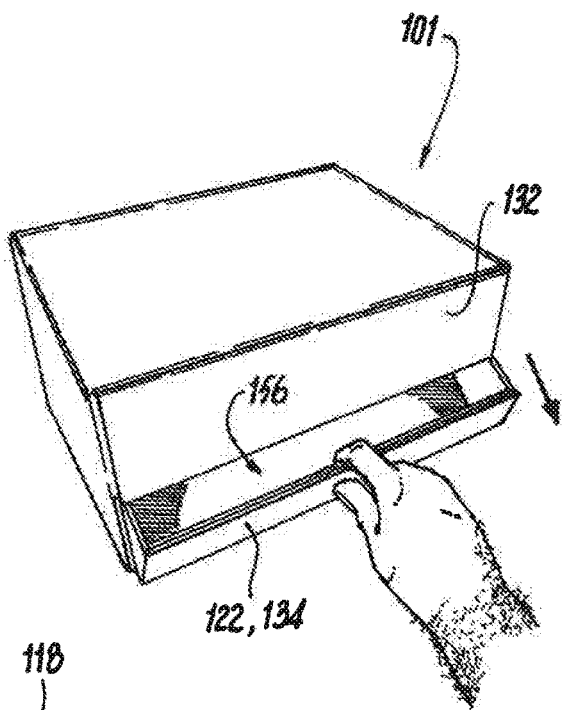
FIG. 9 is a perspective view of the container of FIG. 3, showing manual deployment of the main bird-feeder end flap.
Figure 10:
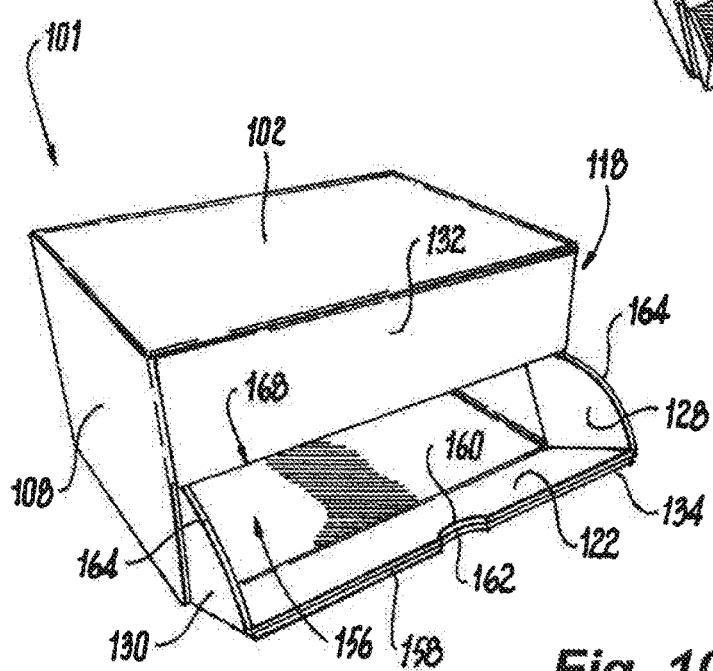
FIG. 10 is a perspective view of the container of FIG. 3, showing the main bird-feeder end flap in the open position for dispensing product from the container.

With reference now to FIG. 8, the main bird-feeder flap 122 and the side bird-feeder flaps 128, 130 (all shown in FIG. 1) are configured to deploy from a closed position shown in FIG. 7, where they cooperate with the plurality of end flaps 118, 120, 124 to enclose the end of the interior space 116 (identified in FIG. 3), to an open position with the main bird-feeder flap 122 hinged outward from the interior space 116 to form an opening 156 in the end of the interior space 116 as shown in FIG. 10, and with the side bird-feeder flaps 128, 130 each forming a side of the opening 156 lateral to the main bird-feeder flap 122. An upper edge 158 of the main bird-feeder flap 122 defines a lunate cut out 160 configured to facilitate manual deployment of the main bird-feeder flap 122. The outer end flap 118 includes a lunate nick 162 which in the erected container 101 overlaps with the lunate cut out 160. As shown in FIG. 8, a finger can be inserted into the lunate cutout 160 by breaking out the lunate nick 162 to allow access to the lunate cut out 160 for manual deployment of the main bird-feeder flap 122. FIG. 9 shows that once a finger is engaged with the inside surface of the bird-feeder flap 122 through the lunate cutout 160, the finger can pull outward so that the line of weakness 136 is broken to deploy the main bird-feeder flap 122 to the open position shown in FIG. 10.

Each side bird-feeder flap 128, 130 includes a rounded edge 164 extending from the main bird-feeder flap 122 to a catch edge 166, which is identified in FIG. 1. The rounded edge 164 is radiused to clear an edge 168 of the opening 156 for hinging the main bird-feeder flap 122 to the open position. The catch edge 166 is configured to catch on the inside of the edge 168 of the opening 156 to prevent over opening the main bird-feeder flap 122. The lower section 134 of the outer flap 118 remains adhered to the outer surface of the main bird-feeder flap 122 in the open configuration.

The methods and systems of the present disclosure, as described above and shown in the drawings, provide for containers with superior properties including improved shipping strength and gravity fed dispensing relative to traditional containers. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A container comprising:
   a plurality of panels connected together at fold lines to extend at least partially around an interior space, including a top panel, a first side panel, a bottom panel and a second side panel;
   a plurality of end flaps, each end flap foldably connected to a respective one of the panels, wherein the end flaps are overlapped with one another to enclose an end of the interior space, wherein one of the end flaps is a main bird-feeder flap; and
   a side bird-feeder flap foldably connected to the main bird-feeder flap, wherein the main bird-feeder flap and the side bird-feeder flap are configured to deploy:
   from a closed position cooperating with the plurality of end flaps to enclose the end of the interior space,
   to an open position with the main bird-feeder flap hinged outward from the interior space to form an opening in the end of the interior space, and with the side bird-feeder flap forming a side of the opening;
   wherein the plurality of end flaps includes: the main bird-feeder flap foldably connected to the bottom panel; a first side end flap foldably connected to the first side panel; a second side end flap foldably connected to the second side panel; and an outer end flap foldably connected to the top panel;
   wherein the outer end flap includes an upper section and a lower section separated from one another by a line of weakness, wherein the upper section of the outer end flap is adhered to an outer surface of the first and second side end flaps, and wherein the lower section of the outer end flap is adhered to an outer surface of the main bird-feeder flap so that the line of weakness can be broken to deploy the main bird-feeder flap to the open position.

2. The container as recited in claim 1, wherein the side bird-feeder flap includes a rounded edge extending from the main bird-feeder flap to a catch edge, wherein the rounded edge is radiused to clear an edge of the opening for hinging the main bird-feeder flap to the open position, and wherein the catch edge is configured to catch on the edge of the opening to prevent over opening the main bird-feeder flap.

3. The container as recited in claim 1, wherein the side bird-feeder flap is a first side bird-feeder flap and further comprising a second side bird-feeder flap foldably connected to the main bird-feeder flap opposite the first side bird-feeder flap.

4. The container as recited in claim 1, wherein an upper edge of the main bird-feeder flap defines a lunate cut out configured to facilitate manual deployment of the main bird-feeder flap.

5. The container as recited in claim 4, wherein the outer end flap includes a lunate nick overlapping with lunate cut out, wherein the lunate nick is configured to be broken to allow access to the lunate cut out for manual deployment of the main bird-feeder flap.

6. The container as recited in claim 1, wherein the top panel, bottom panel, first side panel, and second side panel are devoid of bird-feeder flaps.

7. The container as recited in claim 1, wherein the plurality of end flaps is a first plurality of end flaps and further comprising a second plurality of end flaps at an opposite end of the panels from the first plurality of end flaps, wherein each end flap of the second plurality of end flaps is foldably connected to a respective one of the panels, wherein the end flaps of the second plurality of end flaps are overlapped with one another to enclose an end of the interior space opposite the first plurality of end flaps.

8. The container as recited in claim 1, further comprising an adhesive flap foldably connected to the second side panel and adhered to the top panel.

9. A blank for a container comprising:
   a plurality of panels connected together at fold lines configured for extending at least partially around an interior space, including a top panel, a first side panel, a bottom panel and a second side panel;
   a plurality of end flaps, each end flap foldably connected to a respective one of the panels, wherein the end flaps are configured to be overlapped with one another to enclose an end of the interior space, wherein one of the end flaps is a main bird-feeder flap; and
   a side bird-feeder flap foldably connected to the main bird-feeder flap, wherein the main bird-feeder flap and the side bird-feeder flap are configured to deploy:
   from a closed position cooperating with the plurality of end flaps to enclose the end of the interior space,
   to an open position with the main bird-feeder flap hinged outward from the interior space to form an opening in the end of the interior space, and with the side bird-feeder flap forming a side of the opening;
   wherein the plurality of end flaps includes: the main bird-feeder flap foldably connected to the bottom panel; a first side end flap foldably connected to the first side panel; a second side end flap foldably connected to the second side panel; and an outer end flap foldably connected to the top panel;

wherein the outer end flap includes an upper section and a lower section separated from one another by a line of weakness, wherein the upper section of the outer end flap is configured to be adhered to an outer surface of the first and second side end flaps, and wherein the lower section of the outer end flap is configured to be adhered to an outer surface of the main bird-feeder flap so that the line of weakness can be broken to deploy the main bird-feeder flap to the open position.

10. The blank as recited in claim 9, wherein the side bird-feeder flap includes a rounded edge extending from the main bird-feeder flap to a catch edge, wherein the rounded edge is radiused to clear an edge of the opening for hinging the main bird-feeder flap to the open position, and wherein the catch edge is configured to catch on the edge of the opening to prevent over opening the main bird-feeder flap.

11. The blank as recited in claim 9, wherein the side bird-feeder flap is a first side bird-feeder flap and further comprising a second side bird-feeder flap foldably connected to the main bird-feeder flap opposite the first side bird-feeder flap.

12. The blank as recited in claim 9, wherein an upper edge of the main bird-feeder flap defines a lunate cut out configured to facilitate manual deployment of the main bird-feeder flap.

13. The blank as recited in claim 12, wherein the outer end flap includes a lunate nick configured to overlap with lunate cut out, wherein the lunate nick is configured to be broken to allow access to the lunate cut out for manual deployment of the main bird-feeder flap.

14. The blank as recited in claim 9, wherein the top panel, bottom panel, first side panel, and second side panel are devoid of bird-feeder flaps.

15. The blank as recited in claim 9, wherein the plurality of end flaps is a first plurality of end flaps and further comprising a second plurality of end flaps at an opposite end of the panels from the first plurality of end flaps, wherein each end flap of the second plurality of end flaps is foldably connected to a respective one of the panels, wherein the end flaps of the second plurality of end flaps are configured to be overlapped with one another to enclose an end of the interior space opposite the first plurality of end flaps.

16. The blank as recited in claim 9, further comprising an adhesive flap foldably connected to the second side panel and adhered to the top panel.

* * * * *